(12) United States Patent
Luttinen et al.

(10) Patent No.: US 9,186,945 B2
(45) Date of Patent: *Nov. 17, 2015

(54) CAM ADJUSTABLE SHIM ASSEMBLY

(71) Applicant: GM GLOBAL TECHNOLOGY OPERATIONS LLC, Detroit, MI (US)

(72) Inventors: James L. Luttinen, Brighton, MI (US); Steven A. Lamouria, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/182,998

(22) Filed: Feb. 18, 2014

(65) Prior Publication Data

US 2015/0226250 A1 Aug. 13, 2015

Related U.S. Application Data

(63) Continuation-in-part of application No. 14/175,099, filed on Feb. 7, 2014.

(51) Int. Cl.
*B60G 7/02* (2006.01)
*B62D 17/00* (2006.01)
*B60G 3/04* (2006.01)

(52) U.S. Cl.
CPC .. *B60G 7/02* (2013.01); *B60G 3/04* (2013.01); *B62D 17/00* (2013.01); *B60G 2204/143* (2013.01); *B60G 2204/4103* (2013.01); *B60G 2204/4302* (2013.01); *B60G 2204/4402* (2013.01); *B60G 2204/61* (2013.01); *Y10T 403/125* (2015.01)

(58) Field of Classification Search
CPC ...... B60G 7/02; B60G 3/04; B60G 2204/143; B60G 2204/4103; B60G 2204/4302; B60G 2204/44; B60G 2204/4402; B60G 2204/61; B62D 17/00; Y10T 403/125
See application file for complete search history.

(56) References Cited

U.S. PATENT DOCUMENTS

| | | | | |
|---|---|---|---|---|
| 3,866,938 A * | 2/1975 | Boyd et al. | ............... | 280/86.756 |
| 4,695,073 A * | 9/1987 | Pettibone et al. | ........ | 280/86.757 |
| 5,052,711 A * | 10/1991 | Pirkey et al. | ............. | 280/86.753 |
| 5,104,141 A * | 4/1992 | Grove et al. | ............. | 280/86.753 |
| 5,779,260 A * | 7/1998 | Reilly et al. | ............. | 280/86.754 |
| 6,176,501 B1 * | 1/2001 | Bartolone | ................ | 280/86.756 |
| 7,125,026 B2 * | 10/2006 | Genick, II | ................ | 280/86.753 |
| 7,296,809 B2 * | 11/2007 | Zebolsky | ................... | 280/86.75 |
| 7,370,868 B2 * | 5/2008 | Genick, II | ................ | 280/86.753 |
| 8,544,861 B2 * | 10/2013 | Frens | ....................... | 280/86.753 |
| 2005/0062248 A1 * | 3/2005 | Winkler et al. | .......... | 280/86.758 |
| 2011/0222801 A1 * | 9/2011 | Connell | ......................... | 384/40 |

* cited by examiner

*Primary Examiner* — Drew Brown
(74) *Attorney, Agent, or Firm* — Quinn Law Group, PLLC (57) ABSTRACT

A cam adjustable shim assembly includes a bushing defining a bushing opening. The bushing opening extends longitudinally along a bushing axis to define a bushing bore. The cam adjustable shim assembly further includes a cam disposed in the bushing bore. The cam defines a cam bore extending longitudinally along a first cam axis offset relative to the bushing axis such that the cam bore is eccentric relative to the bushing bore. The cam adjustable shim assembly further includes a bolt at least partially disposed within the cam bore along a first cam axis. The bolt is engaged with the cam bore such that rotation of the bolt about the first cam axis causes the cam to rotate within the bushing about the bushing axis.

20 Claims, 6 Drawing Sheets

CAM ADJUSTABLE SHIM ASSEMBLY

CROSS-REFERENCE TO RELATED APPLICATION CAM BORES

This application is a continuation-in-part and claims the benefit of U.S. patent application Ser. No. 14/175,099, filed Feb. 7, 2014, which is hereby incorporated by reference in its entirety.

TECHNICAL FIELD

The present disclosure relates to a cam adjustable shim assembly for adjusting the position of a control arm relative to a vehicle body.

BACKGROUND

Vehicle suspension systems sometimes include a plurality of control arms. The control arm operatively couples a wheel to a vehicle body, while allowing relative movement between the vehicle body and the wheel. Specifically, the control arm serves as a link to establish proper wheel alignment in relation to the vehicle body.

SUMMARY

It is useful to adjust the position or orientation of the wheel relative to the vehicle body. To do so, the position of the control arm relative to the vehicle body can be adjusted. In order to adjust to position of the control arm, the vehicle may include a cam adjustable shim assembly as described in the present disclosure. In an embodiment, the cam adjustable shim assembly includes a bushing defining a bushing opening. The bushing opening extends longitudinally along a bushing axis to define a bushing bore. The cam adjustable shim assembly further includes a cam disposed in the bushing bore. The cam defines a cam bore extending longitudinally along a first cam axis offset relative to the bushing axis such that the cam bore is eccentric relative to the bushing bore. The cam adjustable shim assembly further includes a bolt at least partially disposed within the cam bore along a first cam axis. The bolt is engaged with the cam bore such that rotation of the bolt about the first cam axis causes the cam to rotate within the bushing about the bushing axis.

The present disclosure also relates to a suspension system for a vehicle. The suspension system includes the cam adjustable shim assembly described above. The cam adjustable shim assembly operatively couples a control arm to a frame structure.

Further, the present disclosure relates to vehicles, such as cars, including the cam adjustable shim assembly described above.

The above features and advantages and other features and advantages of the present invention are readily apparent from the following detailed description of the best modes for carrying out the invention when taken in connection with the accompanying drawings.

DETAILED DESCRIPTION

Figure 1:
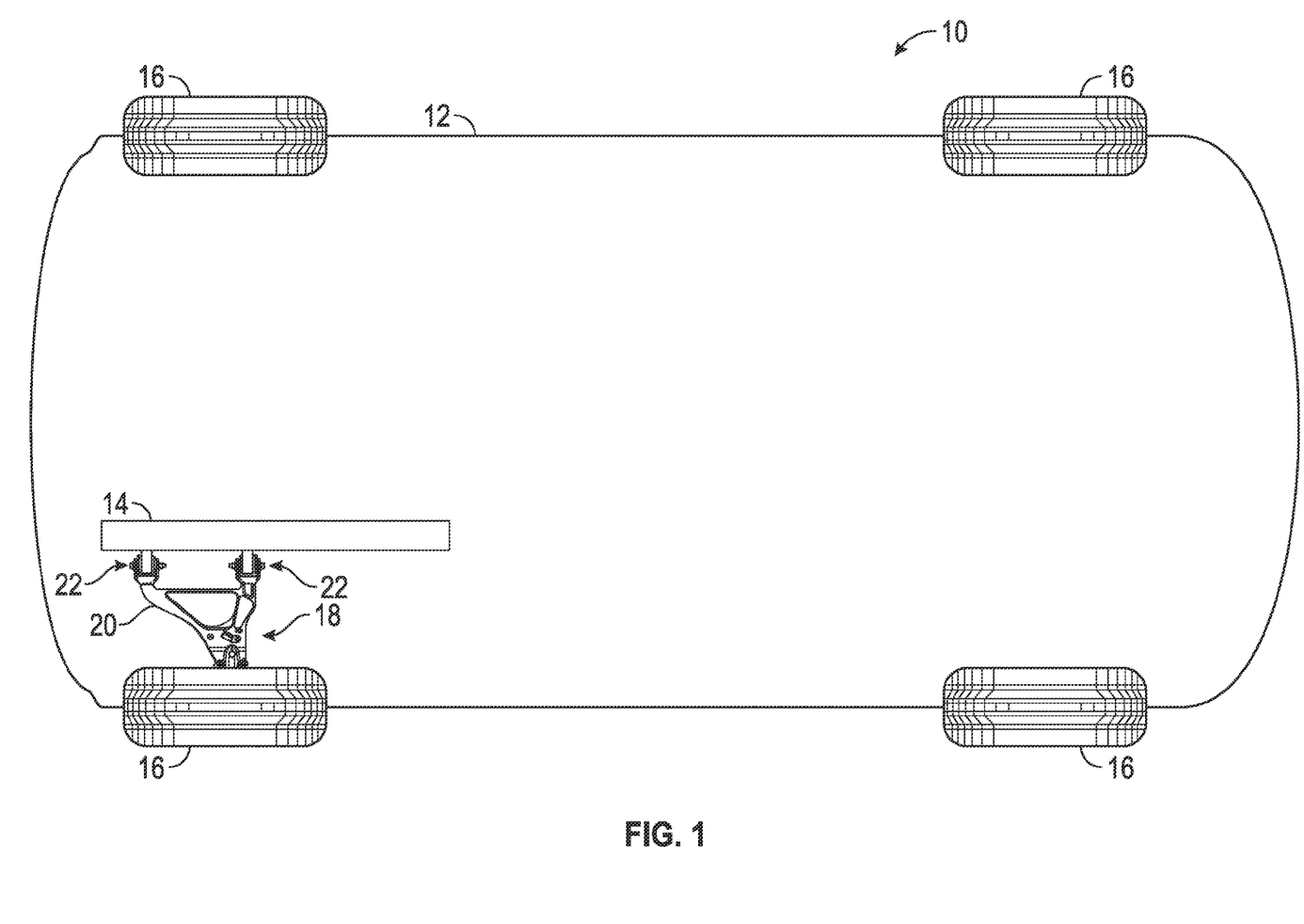
FIG. 1 is a schematic, top view of a vehicle including a suspension system in accordance with an embodiment of the present disclosure, wherein the suspension system includes a cam adjustable shim assembly.

Referring to the drawings, wherein like reference numbers correspond to like or similar components throughout the several figures, and beginning with FIG. 1, a vehicle 10, such as a car, includes a vehicle body 12, a frame structure 14 supporting the vehicle body 12, a plurality of wheels 16 operatively coupled to the frame structure 14, and a suspension system 18 operatively coupling the wheels 16 to the frame structure 14. The suspension system 18 includes at least one control arm 20, such as a wishbone control arm, operatively coupling one of the wheels 16 to the frame structure 14. The control arm 20 is therefore operatively coupled to at least one wheel 16 and may be wholly or partly made of a substantially rigid material, such as a rigid metal. In addition, the suspension system 18 includes at least one cam adjustable shim assembly 22 operatively interconnecting the control arm 20 and the frame structure 14. In the depicted embodiment, two cam adjustable shim assemblies 22 operatively couple one control arm 20 to the frame structure 14. The frame structure 14 may be wholly or partly made of a substantially rigid material, such as a rigid metal.

Figure 2:
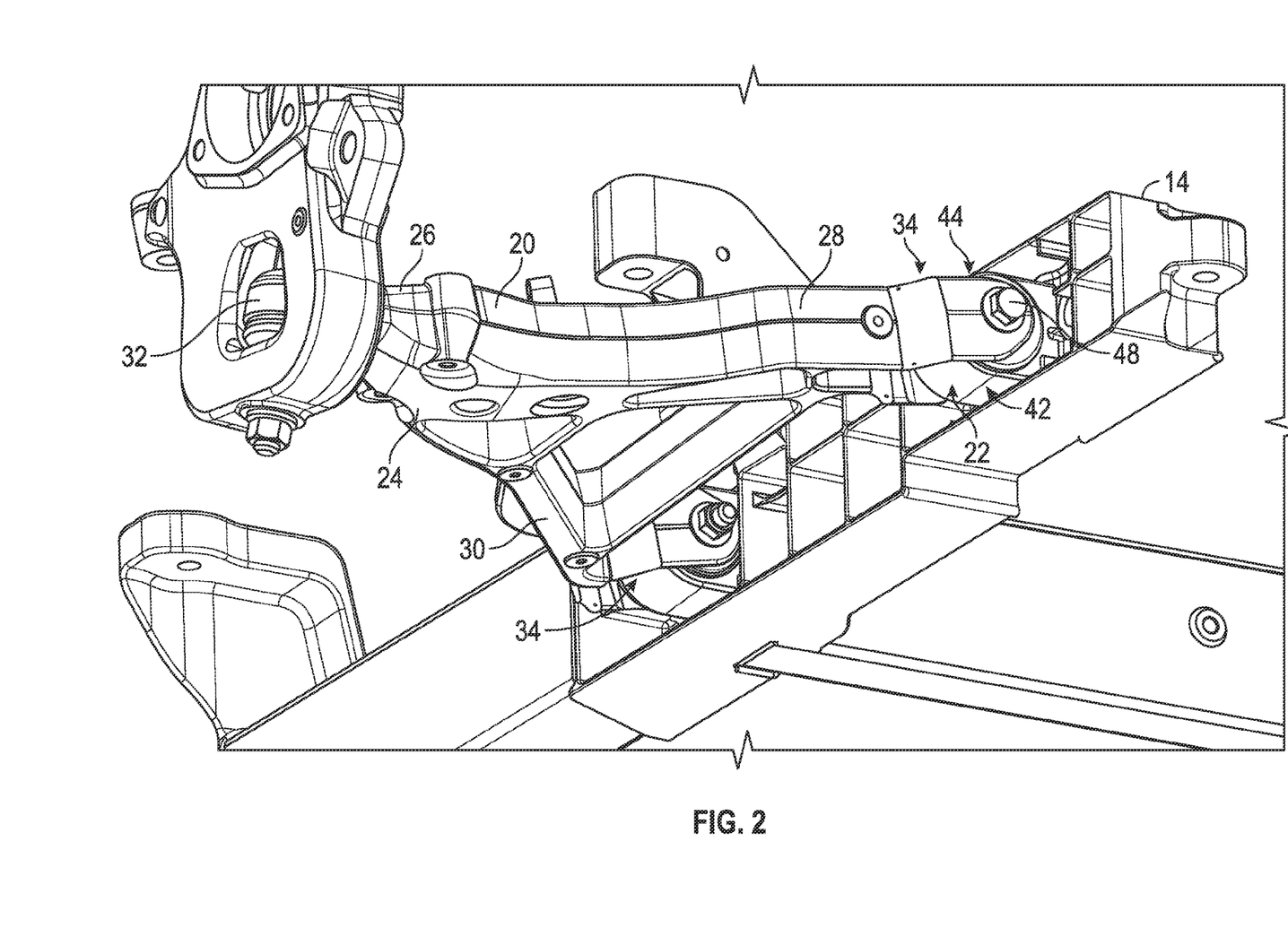
FIG. 2 is a schematic, perspective view of part of the suspension system of FIG. 1.

With reference to FIG. 2, the control arm 20 includes an arm body 24, which may be substantially shaped as a wishbone. In the depicted embodiment, the arm body 24 includes a first body segment 26, a second body segment 28, and a third body segment 30. The first body segment 26 is coupled to a joint 32, such as a ball joint, and interconnects the second and third body segments 28, 30. The joint 32 is coupled to one wheel 16 (FIG. 1) and is fixed to the control arm 20. Accordingly, the joint 32 can move concomitantly with the control arm 20. Because the joint 32 is coupled to one wheel 16 (FIG. 16), the position and orientation of the wheel 16 relative to the frame structure 14 (and the vehicle body 12) can be changed by adjusting the position of the control arm 20 relative to the frame structure 14.

It is useful to adjust the alignment of the wheel 16 (FIG. 16) relative to the vehicle body 12 (and frame structure 14) in order to adjust the camber and caster of the wheel 16. Camber refers to the orientation of the wheel 16, as measured along its vertical axis, relative to the vertical axis of the vehicle 10 when viewed from the front or rear. Caster refers to the orientation of the steering axis relative to the vertical axis of the vehicle 10 when viewed from the side. The camber and caster can be adjusted by moving the control arm 20 relative to the frame structure 14.

Figure 3:
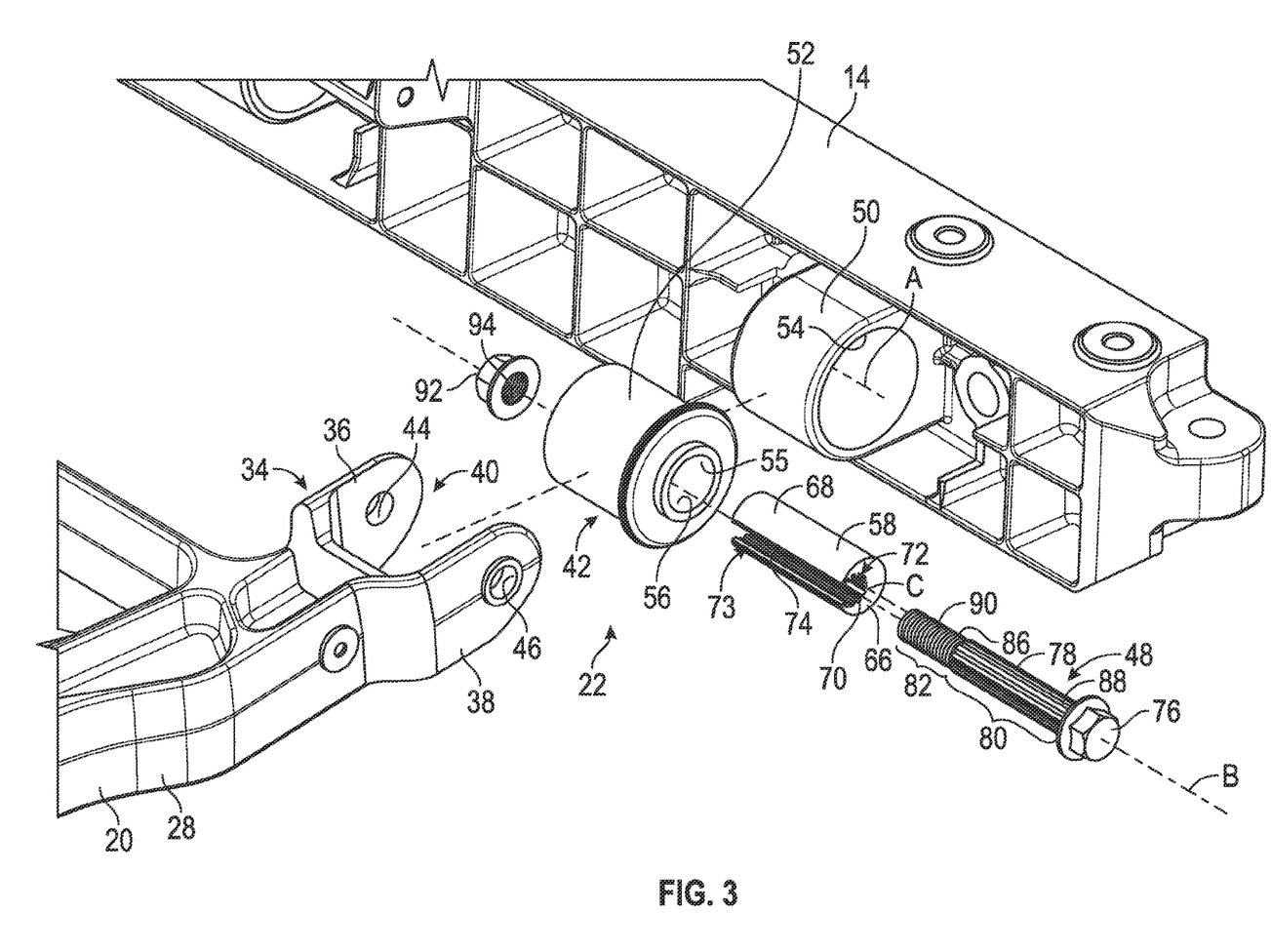
FIG. 3 is a schematic, perspective exploded view of part of the suspension system shown in FIG. 2.
Figure 4:
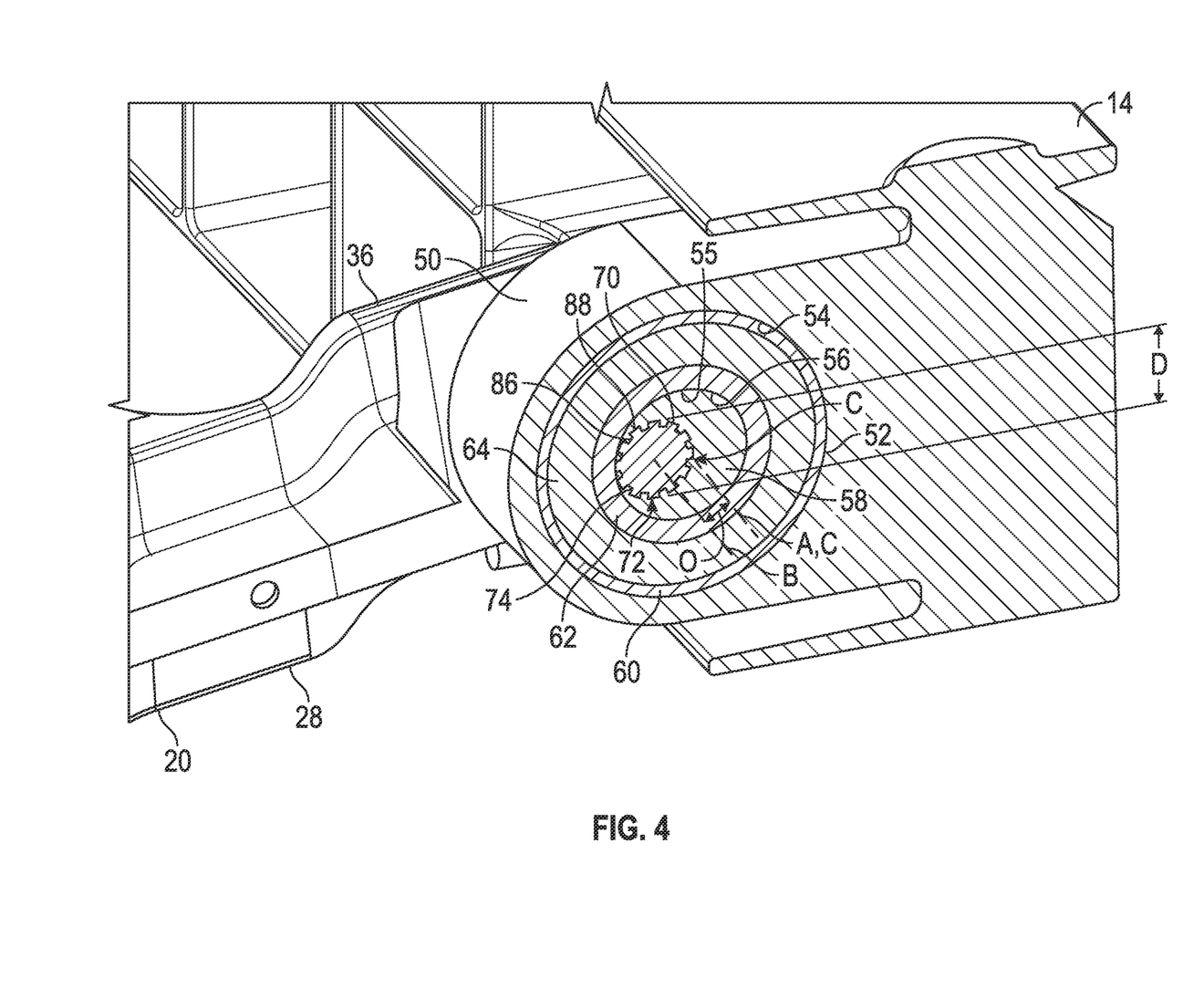
FIG. 4 is a schematic, perspective sectional view of part of the suspension system shown in FIG. 2.

With reference to FIGS. 2-4, each of the second and third body segments 28, 30 includes a coupling portion 34. The coupling portion 34 includes first and second prongs 36, 38 extending from the second body segment 28 (or the third body segment 30). The first and second prongs 36, 38 are spaced apart from each other so as to define a gap 40. The gap 40 is configured, shaped, and sized to receive a bushing 42. The bushing 42 is therefore disposed between the first and second prongs 36, 38. The first prong 36 defines a first hole 44, and the second prong 38 defines a second hole 46. Each of the first and second holes 44, 46 is configured, shaped, and sized to receive a bolt 48. When the cam adjustable shim assembly 22 is completely assembled, the first and second holes 44, 46 partially receive the bolt 48.

The bushing 42 and bolt 48 are part of a cam adjustable shim assembly 22 (FIG. 2) configured to adjust the position of the control arm 20 relative to the frame structure 14. The bushing 42 includes an outer sleeve 52 and an inner sleeve 56. Each of the bushing outer and inner sleeves 42, 56 may have substantially cylindrical shapes. The outer sleeve 52 may be integrally coupled to the frame ring structure 50 and, accordingly, become a part of the frame structure 14. The frame ring structure 50 defines an frame ring structure opening 54 configured shaped, and sized to receive the bushing outer sleeve 52. The bushing outer sleeve 52 defines the bushing inner sleeve opening 56. The bushing inner sleeve opening 56 has a substantially cylindrical shape and may be concentric with the frame ring structure opening 54 when the bushing outer sleeve 52 is disposed within the frame ring structure 50. The frame ring structure opening 54 and the bushing inner sleeve opening 56 may both be referred to as bushing openings. For example, the frame ring structure opening 54 may be referred to as the first bushing opening, and the bushing inner sleeve opening 56 may be referred to as the second bushing opening. The bushing inner sleeve opening 56 (which may be referred to as a bushing opening) extends longitudinally along the bushing axis A to define a bushing bore 55. Thus, the bushing outer sleeve 52, bushing inner sleeve 56, and the frame ring structure opening 54 extend along a bushing axis A (FIG. 4).

With specific reference to FIG. 4, the bushing 42 construction inside of the bushing outer sleeve outer diameter 52 has a first annular layer 60, a second annular layer 64, and a third annular layer 62. The second annular layer 64 is wholly or partly made of a material that has a stiffness that is less than the stiffness of the materials wholly or partially forming the first and third annular layers 60, 62. The third annular layer 62 defines the bushing inner sleeve opening 56. The bushing inner sleeve opening 56 may also have a substantially cylindrical shape and is configured, shaped, and sized to receive a cam 58.

Referring again to FIGS. 2-4, the cam 58 may have a quasi-cylindrical shape, such as a substantially C-shape, and includes a cam body 66. The cam body 66 is configured, shaped, and sized to be rotatably disposed in the bushing 42. Accordingly, the cam 58 can rotate in the bushing inner sleeve opening 56 about the bushing axis A. In particular, the cam 58 can rotate relative to the bushing 42 about the bushing axis A when the cam 58 is disposed in the bushing inner sleeve opening 56. Further, the center C of the cam body 66 is disposed along the bushing axis A when the cam 58 is at least partially disposed in the bushing inner sleeve opening 56. As discussed above, the bushing inner sleeve opening 56 may also be referred to as the bushing opening. The cam 58 is disposed in the bushing bore 55. The cam body 66 defines an outer cam surface 68 and an inner cam surface 70 opposite to the outer cam surface 68. The outer cam surface 68 may be substantially smooth and extends longitudinally along a second cam axis C. The second cam axis C is offset relative to the first cam axis B. Specifically, the second cam axis C is offset relative to the first cam axis B such that the outer cam surface 68 is partially interrupted by the cam bore 72, thereby creating a longitudinal opening 73 between a portion of the outer cam surface 68 and the cam bore 72. The offset O of the second cam axis C relative to the first cam axis B is such that a major diameter D of the bolt external splines 88 remains substantially within the outer cam surface 68. The second cam axis C is aligned with the bushing axis A, and the outer cam surface 68 and the bushing bore 55 are substantially cylindrical. The cam bore 72 defines the inner cam surface 70. The inner cam surface 70 defines a cam bore 72. In other words, the cam 58 defines the cam bore 72 extending longitudinally along a first cam axis B. Thus, the cam bore 72 extends longitudinally through the cam body 66 along the first cam axis B. The first cam axis B is offset relative to the bushing axis A such that the cam bore 72 is eccentric relative to the bushing bore 55. Accordingly, the bushing inner sleeve opening 56 (i.e., the bushing opening) is eccentric relative to the cam bore 72. The cam 58 can also be referred to as a shim.

The cam 58 further includes a plurality of inner splines 74 extending from the inner cam surface 70 of the cam bore 72 toward the first cam axis B. In particular, the inner splines 74 protrude (or otherwise extend) from the inner cam surface 70 in a direction toward the first cam axis B. The inner splines 74 may be arranged annularly along the inner cam surface 70. In particular, the cam bore 72 includes the inner splines 74.

The cam adjustable shim assembly 22 further includes a bolt 48 operatively coupled to the cam 58. The bolt 48 is at least partially disposed within the cam 58 and extends along the first cam axis B. In other words, the bolt 48 is at least partially disposed within the cam bore 72 along the first cam axis B. The first cam axis B is offset relative to the bushing axis A such that the frame ring structure opening 54 and bushing inner sleeve opening 56 are eccentric relative to the bolt 48. Further, the bolt 48 is fixed to the cam 58 such that rotation of the bolt 48 about the first cam axis B causes the cam 58 to rotate within the bushing 42 about the bushing axis A. In other words, the bolt 48 is engaged with the cam bore 72 such that rotation of the bolt 48 about the first cam axis B causes the cam 58 to rotate within the bushing 42 about the bushing axis A. The bolt 48 includes a head 76 and a shank 78 extending from the head 76. The shank 78 extends along the first cam axis B. Further, the shank 78 defines an outer shank surface 86 and includes a splined section 80 and a threaded section 82. The splined section 80 has the external splines 88 extending radially outward from the outer shank surface 86. The external splines 88 are arranged annularly around the first cam axis B. In other words, the external splines 88 are arranged annularly along the outer shank surface 86. The inner splines 74 engage the external splines 88. In particular, the external splines 88 are configured, shaped, and sized to mate with the inner splines 74 of the cam 58. When at least a portion of the bolt 48, such as the shank 78, is disposed in the cam bore 72, the external splines 88 mate with the inner splines 74, thereby fixing the bolt 48 to the cam 58. As a consequence, rotating the bolt 48 about the first cam axis B causes the cam 58 to rotate about the bushing axis A. The cam 58 rotates in the bushing inner sleeve opening 56.

As discussed above, the shank 78 includes the threaded section 82. The threaded section 82 has external threads 90 formed along the outer shank surface 86. The external threads 90 are configured to mate with the inner threads 94 of a nut 92. The inner threads 94 of the nut 92 engage the external threads 90 of the threaded section 82. Therefore, the nut 92 can be coupled to the bolt 48 when the external threads 90 of the bolt 90 mate with the inner threads 94 of the nut 92. The nut 92 can be disposed outside one of the prongs 36, 38. The nut 92 can be tightened to the bolt 48 in order to fix the position and orientation of the bolt 48 relative to the bushing 42 when the bushing 42 is disposed in the gap 40, the cam 58 is disposed in the bushing inner sleeve opening 56, and at least a portion of the bolt 48 (e.g., shank 78) is disposed in the cam bore 72. The nut 92 is pressed against the control arm 20 when it is coupled to the bolt 48. When the bushing outer sleeve 52 is in the frame ring structure opening 54 and the frame ring structure 50 is disposed in the gap 40 between the first and second prongs 36, 38, the bushing inner sleeve opening 56 is eccentric relative the first and second holes 44, 46 of the first and second prongs 36, 38, respectively. The first and second holes 44, 46 also extend along the first cam axis B when bushing 42 is disposed in the gap 40 between the first and second prongs 36, 38. The bolt 48 extends through the first and second holes 44, 46 in order to operatively couple the control arm 20 to the cam 58.

Figure 5:
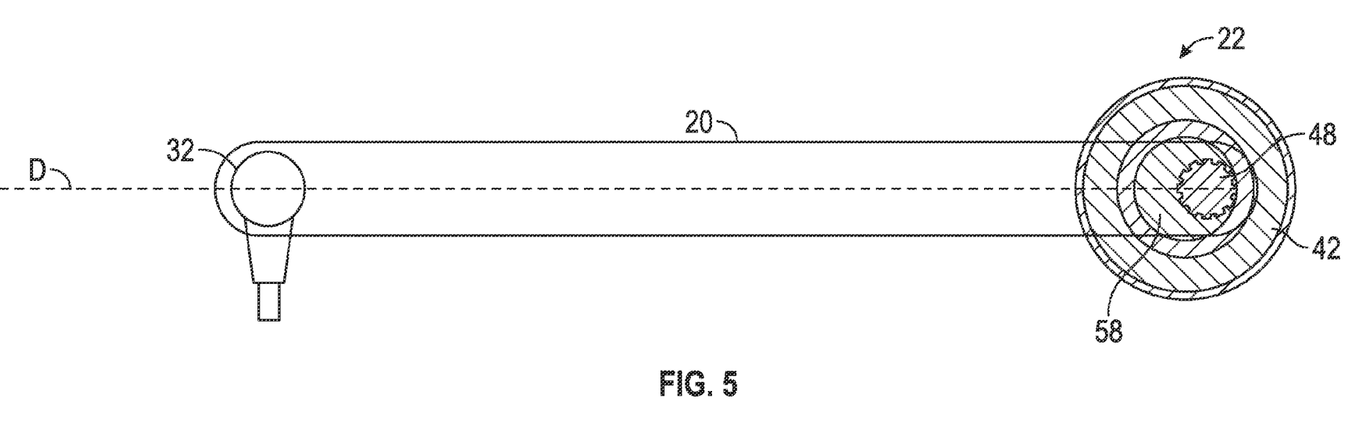
FIG. 5 is a schematic, front view of part of the suspension system of FIG. 2, showing the cam adjustable shim assembly in a first position.
Figure 6:
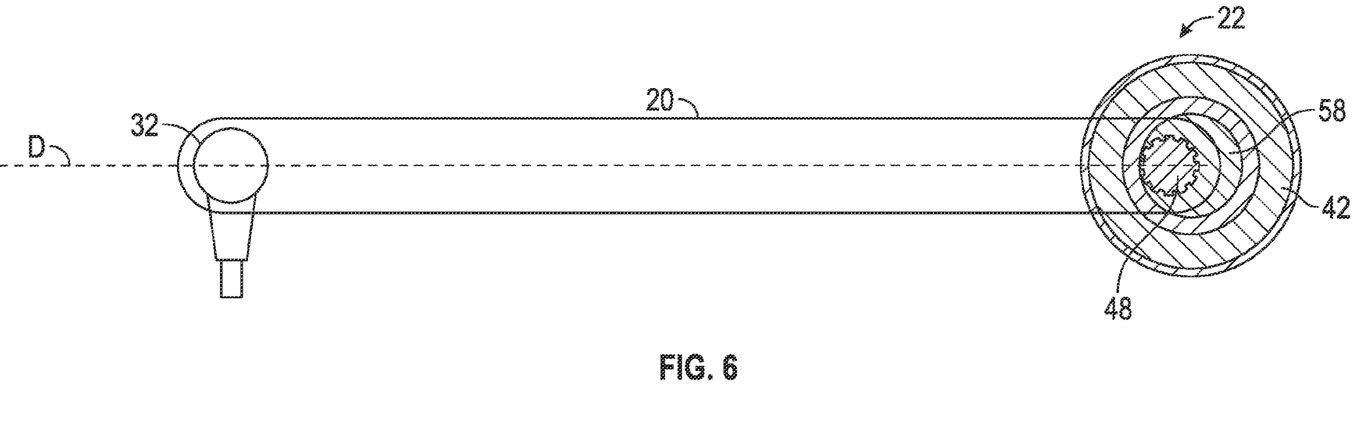
FIG. 6 is a schematic, front view of part of the suspension system of FIG. 2, showing the cam adjustable shim assembly in a second position.
Figure 7:
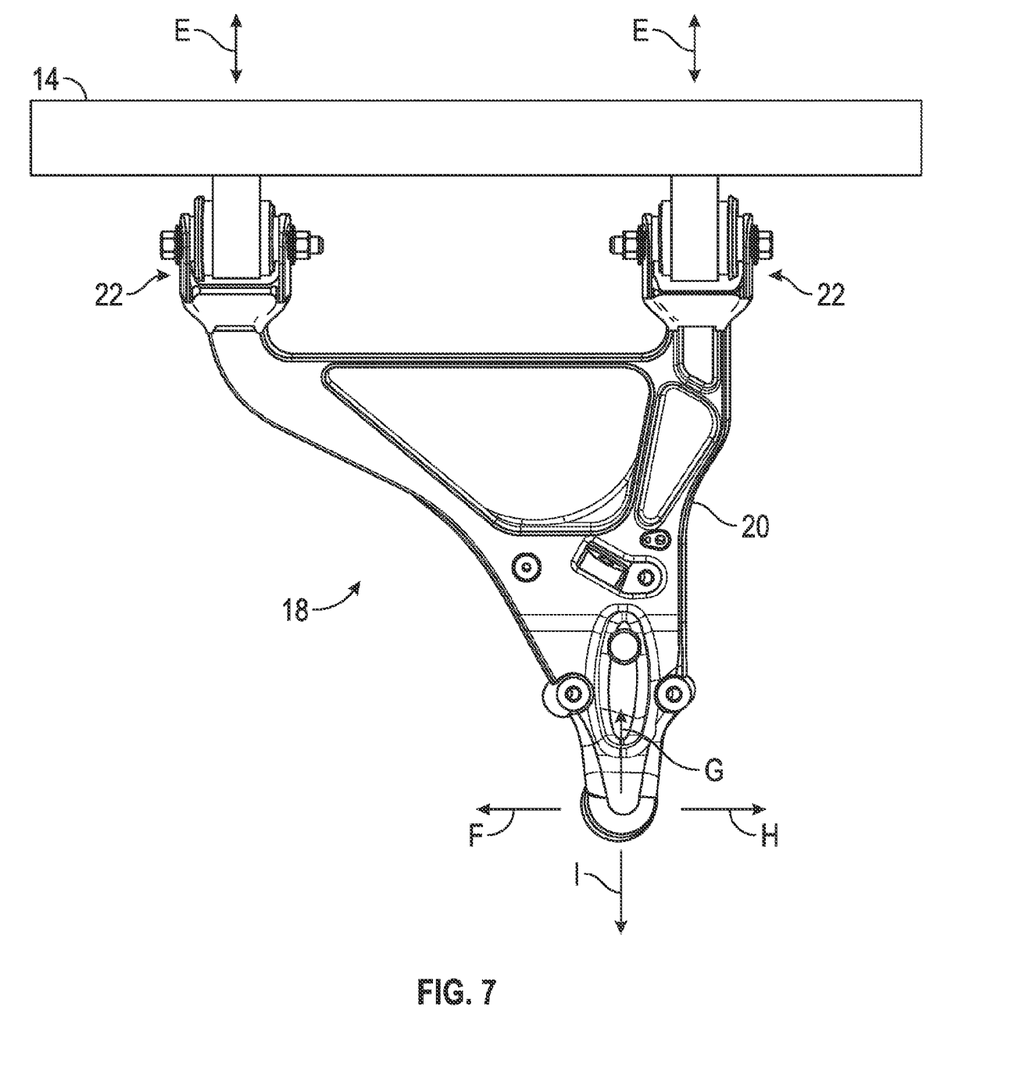
FIG. 7 is a schematic, top view of part of the suspension system of FIG. 2.

With reference to FIGS. 5-6, during operation, the cam adjustable shim assembly 22 can be used to move the control arm 20 relative to the frame structure 14 along a third axis D between a first position (FIG. 5) and a second position (FIG. 6). Thus, the control arm 20 is coupled to the cam 58 via the bolt 48 such that rotation of the cam 58 within the bushing 42 causes the control arm 20 to move relative to the frame structure 14. As the control arm 20 moves relative to the frame structure 14, the joint 32 moves relative to the frame structure 14, thereby adjusting the camber or caster (or both) of the wheel 16 in relation to the vehicle body 12. Before adjusting the position of the control arm 20 relative to the frame structure 14, the nut 92 may be untightened from bolt 48. Then, the bolt 48 is rotated relative to the bushing 42 about the first cam axis B (FIG. 4). Rotating the bolt 48 about the first cam axis B (FIG. 4) causes the cam 58 to rotate about the bushing axis A (FIG. 4) relative to the bushing 42. As discussed above, the cam 58 rotates within the bushing 42, while the bushing 42 remains stationary relative to the frame structure 14. Because the bolt 48 couples the control arm 20 to the cam 58, rotating the cam 58 about the bushing axis A (FIG. 4) causes the control arm 20 to move in the direction indicated by double arrows E (FIG. 7). As discussed above, the suspension system 18 may include two cam adjustable shim assemblies 22 coupled to a single control arm 20. Each cam adjustable shim assembly 20 can be adjusted independently of the other in order to adjust camber and/or caster of the wheel 16. The movement of the cam adjustable shim assemblies 20 causes the joint 32 to move in any of the directions F, G, H, I depending on the adjustment performed in each cam 58. Moving the joint 32 causes at least one of the wheels 16 to move as well. Thus, the control arm 20 is operatively coupled to one wheel 16 via the cam adjustable shim assembly 22 such that rotation of the bolt 48 about the first cam axis B causes the wheel 16 to move relative to the frame structure 14. After adjusting the camber and caster of the wheels 16 as desired, the nut 92 can be tightened to the bolt 48 in order to fix the position of the bolt 48 relative to the bushing 42.

While the best modes for carrying out the invention have been described in detail, those familiar with the art to which this invention relates will recognize various alternative designs and embodiments for practicing the invention within the scope of the appended claims.

The invention claimed is:

1. A cam adjustable shim assembly, comprising:
a bushing defining a bushing opening, the bushing opening extending longitudinally along a bushing axis to define a bushing bore;
a cam disposed in the bushing bore, the cam defining a cam bore extending longitudinally along a first cam axis offset relative to the bushing axis such that the cam bore is eccentric relative to the bushing bore;
a bolt at least partially disposed within the cam bore along the first cam axis, wherein the bolt is engaged with the cam bore such that rotation of the bolt about the first cam axis causes the cam to rotate within the bushing about the bushing axis.

2. The cam adjustable shim assembly of claim 1, wherein the bolt includes external splines, and the cam bore includes inner splines engaging with the external splines of the bolt.

3. The cam adjustable shim assembly of claim 2, further comprising a nut coupled to the bolt.

4. The cam adjustable shim assembly of claim 3, wherein the bolt includes a head and a shank extending from the head, and the shank includes a threaded section having external threads and a splined section having the external splines, and the nut has inner threads engaging with the external threads.

5. The cam adjustable shim assembly of claim 4, wherein the cam bore defines an inner cam surface, and the inner splines extend from the inner cam surface of the cam bore.

6. The cam adjustable shim assembly of claim 5, wherein the shank defines an outer shank surface and the external splines extend from the outer shank surface.

7. The cam adjustable shim assembly of claim 2, wherein the cam includes a cam body defining an outer cam surface extending longitudinally along a second cam axis offset relative to the first cam axis.

8. The cam adjustable shim assembly of claim 7, wherein the second cam axis is offset relative to the first cam axis such that the outer cam surface is partially interrupted by the cam bore thereby creating a longitudinal opening between a portion of the outer cam surface and the cam bore.

9. The cam adjustable shim assembly of claim 8, wherein the offset of the second cam axis relative to the first cam axis is such that a major diameter of the bolt external splines remains substantially within the outer cam surface.

10. The cam adjustable shim assembly of claim 7, wherein the second cam axis is aligned with the bushing axis and the outer cam surface and the bushing bore are substantially cylindrical.

11. A suspension system, comprising:
a control arm;
a frame structure; and
a cam adjustable shim assembly operatively interconnecting the control arm and the frame structure, wherein the cam adjustable shim assembly includes:
a bushing fixed to the frame structure such that the bushing remains stationary relative to the frame structure, the bushing defining a bushing opening, the bushing opening extending longitudinally along a bushing axis to define a bushing bore;
a cam disposed in the bushing bore, the cam defining a cam bore extending longitudinally along a first cam axis offset relative to the bushing axis such that the cam bore is eccentric relative to the bushing bore;
a bolt at least partially disposed within the cam bore along the first cam axis, the bolt coupling the bushing to the control arm, and the bolt being engaged with the cam bore such that rotation of the bolt about the first cam axis causes the cam to rotate within the bushing about the bushing axis; and
wherein the control arm is coupled to the cam via the bolt such that rotation of the cam within the bushing causes the control arm to move relative to the frame structure.

12. The suspension system of claim 11, wherein the bolt includes external splines, and the cam bore includes inner splines engaging with the external splines of the bolt.

13. The suspension system of claim 12, further comprising a nut coupled to the bolt and pressed against the control arm.

14. The suspension system of claim 13, wherein the bolt includes a head and a shank extending from the head, the shank includes a threaded section having external threads and a splined section having the external splines, and the nut has inner threads engaging with the external threads.

15. The suspension system of claim 14, wherein the cam bore defines an inner cam surface, and the inner splines extend from the inner cam surface of the cam bore.

16. The suspension system of claim 15, wherein the cam includes a cam body defining an outer cam surface extending longitudinally along a second cam axis offset relative to the first cam axis.

17. The suspension system of claim 16, wherein the second cam axis is offset relative to the first cam axis such that the outer cam surface is partially interrupted by the cam bore thereby creating a longitudinal opening between a portion of the outer cam surface and the cam bore.

18. The suspension system of claim 17, wherein the offset of the second cam axis relative to the first cam axis is such that a major diameter of the bolt external splines remains substantially within the outer cam surface.

19. The suspension system of claim 18, wherein the second cam axis is aligned with the bushing axis and the outer cam surface and the bushing bore are substantially cylindrical.

20. A vehicle, comprising:
   a wheel;
   a control arm operatively coupled to the wheel;
   a frame structure; and
   a cam adjustable shim assembly interconnecting the control arm to the frame structure, wherein the cam adjustable shim assembly includes:
      a bushing fixed to the frame structure such that the bushing remains stationary relative to the frame structure, the bushing defining a bushing opening extending longitudinally along a bushing axis to define a bushing bore;
      a cam disposed in the bushing bore, the cam defining a cam bore extending longitudinally along a first cam axis offset relative to the bushing axis such that the cam bore is eccentric relative to the bushing bore;
      a bolt at least partially disposed within the cam bore along a first cam axis, the bolt coupling the bushing to the control arm, wherein the bolt is engaged with the cam bore such that rotation of the bolt about the first cam axis causes the cam to rotate within the bushing about the bushing axis, the control arm being coupled to the cam via the bolt such that rotation of the cam within the bushing causes the control arm to move relative to the frame structure; and
   wherein the control arm is operatively coupled to the wheel via the cam adjustable shim assembly such that rotation of the bolt about the first cam axis causes the wheel to move relative to the frame structure.

* * * * *